United States Patent [19]
Stitt

[11] 3,717,756
[45] Feb. 20, 1973

[54] HIGH PRECISION CIRCULATING DIGITAL CORRELATOR

[75] Inventor: James R. Stitt, St. Petersburg, Fla.

[73] Assignee: Electronic Communications Inc., St. Petersburg, Fla.

[22] Filed: Oct. 30, 1970

[21] Appl. No.: 85,532

[52] U.S. Cl. .............235/181, 235/150.53, 235/156, 324/77 H
[51] Int. Cl. ...............................................G06f 15/34
[58] Field of Search....235/150.52, 150.53, 181, 197, 235/152, 156; 328/165, 166, 167; 324/77 G, 77 H

[56] References Cited

UNITED STATES PATENTS

| | | | |
|---|---|---|---|
| 3,314,015 | 4/1967 | Simone | 328/165 |
| 3,449,553 | 6/1969 | Swan | 235/181 X |
| 3,553,722 | 1/1971 | Ott | 235/156 |
| 3,514,585 | 5/1970 | Norsworthy | 235/181 |
| 3,303,335 | 2/1967 | Pryor | 235/181 |
| 3,544,775 | 12/1970 | Bergland et al | 235/181 X |
| 3,639,848 | 2/1972 | Elliott | 328/167 |

FOREIGN PATENTS OR APPLICATIONS 1,473,006  2/1967  France ..................235/181

Primary Examiner—Felix D. Gruber
Attorney—Sandoe, Hopgood and Calimafde

[57] ABSTRACT

A digital correlator of high precision and relative simplicity includes a pair of circulating memories, a multiplier and an accumulator. The input signal to be studied is sampled to produce a series of binary samples which are stored in one of the memories. The correlation coefficients of the input signal are computed by forming the products of the samples and summing those products to the corresponding correlation coefficients previously stored in the other memory, to thereby update the coefficients during each sampling of the input signal.

7 Claims, 4 Drawing Figures $$\hat{y}(m) = C(o)X(m) + C(1)X(m-1) + C(2)X(m-2) + C(3)X(m-3)$$

$$\hat{y}(m+1) = C(1)X(m) + C(2)X(m-1) + C(3)X(m-2)$$

$$\hat{y}(m+2) = C(2)X(m) + C(3)X(m-1)$$

$$\hat{y}(m+3) = C(3)X(m)$$

INVENTOR.
JAMES R. STITT

HIGH PRECISION CIRCULATING DIGITAL CORRELATOR

The present invention relates generally to a system for deriving the correlation function of a signal, and more particularly to an improved digital correlator for deriving correlation coefficients having high precision and reduced complexity.

The computation of correlation functions is of significant utility in communication systems, such as radar, sonar and telemetry systems, in which the received signals are of relatively low level and are contained in a noisy background. The derivation of the correlation function increases the effective signal-to-noise ratio by sensing the periodicity of the received signal as opposed to the random or non-periodic nature of the background noise signals.

One known technique for identifying the low-level, received signal is to obtain the power density spectrum of the received signal. This spectrum is in turn obtained by taking the Fourier transform of the autocorrelation function of the signal. The technique is discussed in greater detail at page 7 of "The Measurement of Power Spectra" by Blackman and Tukey, Dover Publications, 1958.

The normalized discrete autocorrelation function of a signal may be defined by the following equation:

$$R(k) = \lim_{N \to \infty} \frac{1}{N} \sum_{n=0}^{N} x(n)x(n+k); \; k=0, 1, \ldots K \quad (1)$$

where $R(k)$ is the autocorrelation function;
$x(n)$ is the sampled input signal under study;
$N$ is the number of samples of the input signal; and
$k$ is a sample increment.

Several attempts have been made in the past to obtain the autocorrelation function of a signal by the employment of digital techniques. These systems have been somewhat successful in producing reasonably accurate correlation functions, but have required for this purpose a relatively complex arrangement of digital components. The complexity and number of the components required in the conventional digital correlators is largely a result of the need to make the correlation span $N$ in equation (1) as large as possible so as to obtain the best approximation of the correlation function, it being understood that a precise calculation of the limit of the equation is not possible in a finite machine since this would require an infinite value of $N$.

The state-of-the art approach to the digital implementation of the correlation function equation has been to employ memories capable of storing $N$ words; the larger the memory capacity the better will be validity of the approximation of the correlation function. Enlarging the memory capacity is, however, a primary cause of the component complexity and cost that characterizes the known digital correlators.

In addition the known digital correlators commonly employ parallel as opposed to serial techniques, and as a result, fabrication of the digital components by MOS and LSI techniques is not available for much of the digital circuitry in these correlators such as the shift register memories. This adds further to the complexity as well as to the size and cost of the conventional digit correlators.

Still a further additional cause of component complexity of the known digital correlators is the need for additional circuitry to permit continuous storage and readout of the correlation coefficients after each calculation, if that capability is present in the conventional digital correlator.

Similar binary techniques can be employed in a transverse digital filter by means of which is predetermined frequency operation can be performed on an input signal. A filter of this type is disclosed, for example, in U.S. Pat. No. 3,639,848, entitled Transverse Digital Filter, and assigned to the assignee of the present application. The digital filter of the present invention is capable of preforming a similar operation as the filter disclosed in said co-pending application, but has the additional feature that a new output value of the transformed signal is presented during each sampling of the input signal without the need for newly forming the products of all the filter coefficients and previously derived samples of the input signal.

It is an object of the invention to provide a digital correlator capable of operating at high precision with reduced circuit complexity.

It is another object of the invention to provide a digital correlator requiring a reduced number of components, many of which can be fabricated by MOS techniques.

It is a further object of the invention to provide an improved digital correlator in which the correlation scan can be varied without requiring a modification of the circuit components.

It is still a further object of the invention to provide an improved digital correlator including memories, in which the word-storage capacity of the memories is independent of the correlation scan, and thus of the accuracy desired in determining the correlation function.

It is yet a further object of the invention to provide an improved digital correlator of the type described in which the correlation coefficients are continually stored and available after each sampling and calculation, and once finally computed, are stored for subsequent readout and analysis.

It is still another object of the invention to provide a transverse digital filter having a minimum number of readily fabricated components and in which a new output value is computed each time a new input sample is provided to the filter.

It is yet a further object of the invention to provide a transverse digital filter of the type described in which the nature of the filtering operation can be readily modified.

Briefly stated, the digital correlator of the invention utilizes the repetitive nature of the summation steps of the correlation function equation (1) to compute the correlation coefficients with a reduced number of circuit components. The input signal to be analyzed is sampled at a suitable rate and converted into a series of binary words or samples each of which is respectively representative of the instantaneous amplitude of the input signal at the sampling time.

The sampled word is initially multiplied by itself and then sequentially by each sample that has been previously stored in a first circulating memory. The sample products are sequentially added to the corresponding previously calculated correlation coefficients stored in a second circulating memory. The number of computation, to wit, the correlation span $N$, required to derive the correlation coefficients may take any value commensurate with the desired accuracy of the computed coefficients, and is independent of the capacity of the memories.

In another aspect of the invention, the two circulating memories are employed in a transverse digital filter to perform a predetermined filtering operation on an input signal. The filter coefficients are initially stored in one of the memories, and the second memory has stored therein the partial values of the output value signals which are the previously formed partial sums of the products of the filter coefficients and the associated input samples. The products of the new sample and the filter coefficients stored in one memory are formed and added to the appropriate partial sums stored in the other memory, to thereby produce from one of the stored partial sums the filter output value signal for the new sample, and to update the other partial sums. The former signal is computed for each new input sample and for each recycling of the stored filter coefficients, and is thus available during each sampling period.

To the accomplishment of the above and to such further objects as may hereinafter appear, the present invention relates to a high precision circulating digital correlator and filter substantially as defined in the appended claims and as described in the following specification, taken together with the accompanying drawing in which:

Figures 1, 2:
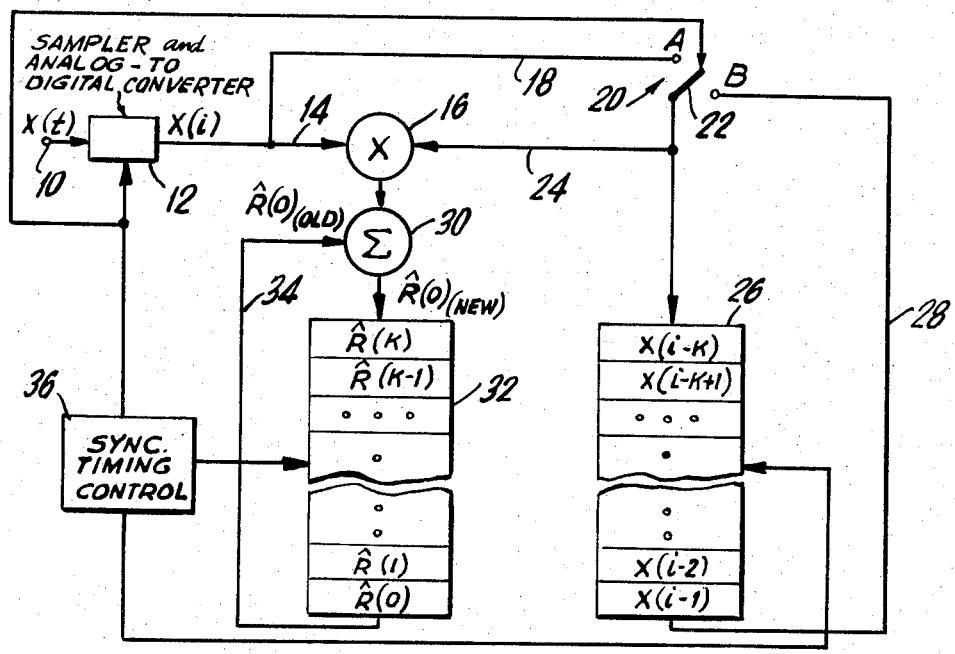
FIG. 1 is a schematic diagram, in block form, of a digital correlator according to one embodiment of the invention.
FIG. 2 is an expansion of equation (1) illustrating the repeating diagonals employed in the operation of the digital correlator of FIG. 1.

Before describing the operation of the embodiment of the invention as illustrated in FIG. 1, it is believed to be helpful to further analyze equation (1), and particularly the expansion of that equation provided in FIG. 2 which illustrates the repeating diagonals of the equation. From equation (1), it can be seen that the individual correlation coefficients $\hat{R}(k)$ are the sums of all products of the sampled words $x(n)$ and the word sample $k$ increments thereafter, that is $x(n+k)$. Thus, as shown in the upper row of FIG. 2, the zero order correlation coefficient $\hat{R}(O)$ is the sum of the products of each sampled word multiplied by itself, whereas the $k$th order coefficient $\hat{R}(k)$ defined by the summation in the bottom row of FIG. 2, is the sum of the products of each sample word multiplied by the sampled word displaced therefrom by $k$ increments.

In the following discussion each product term in the expansion of equation (1) shown in FIG. 2 is referred to by its "matrix" position. That is, $x(2)X(2+2)$ is referred to as $P_{22}$.

Referring now to FIG. 2 the diagonal labeled "-second diagonal" is formed of the product terms $P_{02}$, $P_{11}$, and $P_{20}$, which are respectively the third, second and first terms of the zero order and first and second order coefficients, $\hat{R}(0)$, $\hat{R}(1)$ and $\hat{R}(2)$. It will be noted that each of these terms includes the sample $x(2)$ in their product, that is, each of these product terms contains $x(2)$ as a multiplier, and the multiplicands are respectively $x(2)$, $x(1)$ and $x(0)$. When these products are derived, they are added to their respective coefficient rows and are thus employed to produce the respective correlation coefficients defined by the summation of each of these rows. For example, the $P_{02}$ term is in the first coefficient row and is used to compute the zero order coefficient $\hat{R}(0)$.

The implementation of equation (1) is continued by employing the next sample $x(3)$ to compute the products $P_{03}$, $P_{12}$, $P_{21}$ and $P_{30}$, the components of the third diagonal. These components are in turn respectively added to the first three correlation coefficient $\hat{R}(0)$, $\hat{R}(1)$, $\hat{R}(2)$ and $\hat{R}(3)$. Each succeeding sample is thereafter employed in a similar manner to compute all the components, to wit, the products of its corresponding succeeding diagonals. These components are in turn then added to the proper correlation coefficient stored in a memory. When the $(k+1)$ th sample is derived, it is used to compute, as shown in FIG. 2, the $(k+1)$th diagonal which contains the product components $^P(0)(k+1), ^P(1)(k), ^P(2)(k-1) \ldots ^P(k)(1)$. It is a significance to note that none of the product components in this series requires the sampled word $x(0)$ in its derivation. It may therefore be erased from the sample word memory to be described below, and that memory thus need only contain the $k$ most recent samples, $x(k+1) - x(1)$. Thus, the sample word memory need only have a $k$-word storage capacity. Stated in another way, that memory capacity is determined solely upon $k$, and not on $N$, the correlation span in equation (1). This is a significant departure from the prior art approach to the design of digital correlators.

The number of diagonals employed in the computation of the correlation coefficients is equal to $N$, and is determined only by the accuracy desired in that computation. The value of $N$ must, however, exceed the value of $k$ to ensure at least one product component $x(k)(0)$ for the $k$th order coefficient $R(k)$.

In FIG. 1 there is schematically illustrated a digital correlation according to one embodiment of the invention for implementing the autocorrelation function as defined in equation (1) utilizing the principles set forth above. An input analog signal $x(t)$ to be studied is received at an input terminal 10 which in turn is coupled to the input of a sampling circuit and analog-to-digital converter 12 in which the input signal is sampled at an appropriate rate and converted into a series of binary words or samples $x(i)$. Each of these samples is proportional to the instantaneous amplitude of the input analog signal $x(t)$ at the sampling period. The design and manner of operation of analog-to-digital converter 12 is considered to be well within the skill of those skilled in the digital art and is therefore not further described herein.

The output of converter 12 is coupled by a line 14 to one input of a multiplier 16, and by a line 18 to one contact of an electronic switch 20, which may be conveniently in the form of a multiplexer the design of which is also within the skill of the average digital designer.

The other input to multiplier 16 is coupled to the contact 22 of switch 20 by a line 24. Contact 22 is also coupled to the input of a circulating shift-register memory 26, the output of which is in turn coupled by a line 28 to the other contact of switch 20.

The output of multiplier 16 is coupled to one input of a summer or accumulator 30. The second input to summer 30 is coupled by a line 34 to the output of a second circulating shift register memory 32. The input of memory 32 is in turn coupled to the output of summer 30. The operation of the system is controlled by timing and synchronizing pulses generated in a known manner in a control circuit 36 and coupled to converter 12, switch 20 and memories 26 and 32. The frequency of the control signals supplied to memories 26 and 32 is $k$ times that of the control signals applied to switch 20 and converter 12.

In the operation of the system of FIG. 1 let us assume that $i-1$ sample words have been previously derived and stored in the sample word circulating memory 26. At the next sample $x(i)$, switch 20 is initially in position A so that the product $P_{oi}(x(i)x(i))$ is formed in multiplier 16. That component is then added in summer 30 to the value of the zero order coefficient $\hat{R}(0)$ previously computed and stored in memory 32. The thus updated value of that correlation coefficient is then restored in memory 32.

Switch 20 is then switched to the B position under the control of a timing pulse from control circuit 36 whereupon the input sample $x(i)$ is sequentially multiplied in multiplier 16 by the preceeding $k$ samples stored in memory 26, that is, samples $x(i-1)-(i-k)$, to thereby respectively form the products $P(1)$ $(i-1)$ through $P(i)$ $(i-k)$ as the samples circulate through memory 26 and into multiplier 16 under the control of the timing pulses from control circuit 36.

As these products are being formed in multiplier 16 they are at the same time added in summer 30 to the corresponding correlation coefficients $\hat{R}$ which are at that time being circulated through memory 32 by control signals from control circuit 36. The new updated values of the correlation coefficients $\hat{R}(0)-\hat{R}(K)$ replace the previously calculated values of these coefficients stored in memory 32. The latest sample $x(i)$ is now stored in memory 26 and the earliest sample $x(i-k)$ is removed from the memory as it is no longer required to compute the correlation coefficients for the reasons set forth above.

A new sample $x(i+1)$ is then derived at converter 12, switch 20 is returned to position A, and the cycle described above is repeated to further update and restore the values of the correlation coefficients in memory 32.

The operation of the system continues until N samples have been obtained and processed in the manner described above until the memory 32 contains the correlation coefficients $\hat{R}(0)-\hat{R}(k)$ computed to their desired accuracy. These coefficients are thereafter stored in memory 32 for further use. For example, they can at any time be passed through a suitable low pass filter and displayed on an oscilloscope display.

In a typical embodiment of the invention each of memories 26 and 32 consisted of an MOS shift register having 200 stages, that is, $k$ is selected to be 200. The input signal is sampled at a rate of 10kHz. As noted, the value of N can be arbitrarily chosen depending solely on the desired accuracy of the calculated correlation coefficients.

The digital correlator of the invention as herein described permits the accurate computation of correlation coefficients of an input analog signal in a manner requiring a minimum number of components. Moreover, the accuracy of computation is independent of the word storage capacity of the sample and coefficient memories 26 and 32; that capacity is independent of the correlation span N. The correlation coefficients are computed on a real time basis and are continually available for readout both during and following their computation and storage in the memory. Since serial techniques may be used in the digital correlator of the invention of the circulating memories may be readily fabricated according to MOS techniques.

Figures 3, 4:
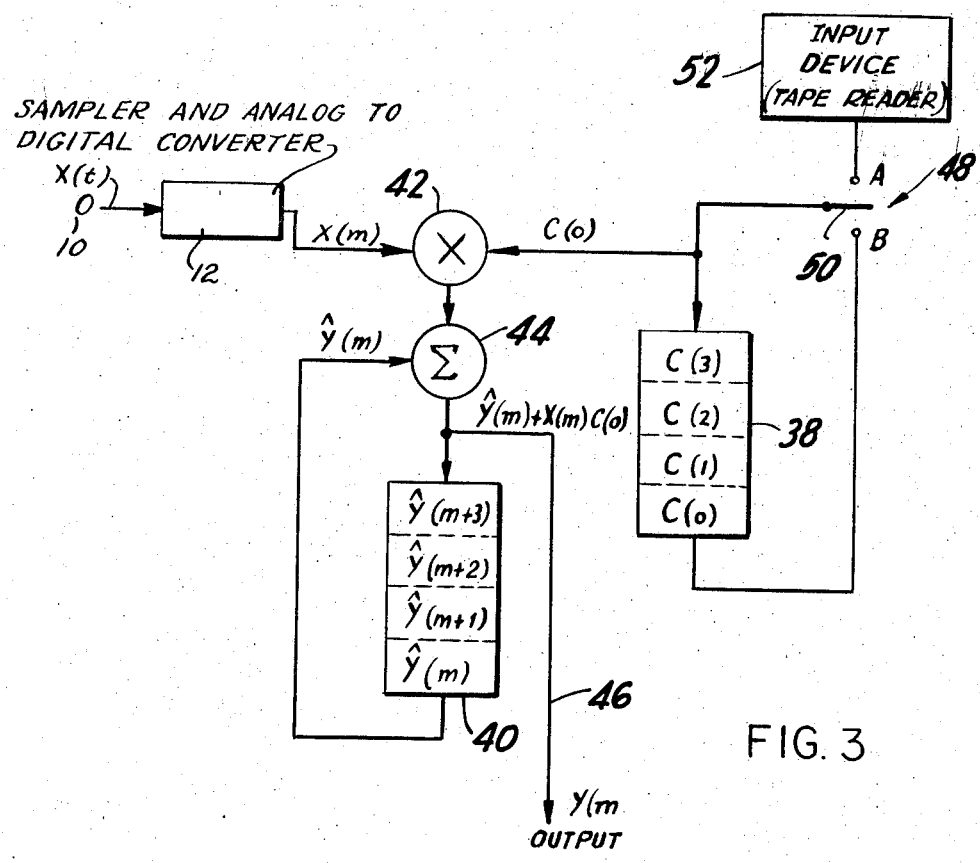
FIG. 3 is a schematic diagram similar to that of FIG. 1 of a transverse digital filter embodying the features of the invention.
FIG. 4 is a series of equations for explaining the operation of the digital filter of FIG. 3.

FIG. 3 illustrates the utilization of the principles of the invention is a transverse digital filter capable of performing the operation defined in the following manner:

$$Y(m) = \sum_{k=0}^{k=K-1} C(k)X(m-k)$$

Where:

$Y(m)$ — is the filtered output at time $m$.

$X(m-k)$ — is the input to the filter at time $m-k$.

$C(k)$ — $K$th filter coefficient $k$ — is an integer.

The digital filter capable of performing this operation, as shown schematically in FIG. 3, comprises a first circulating memory 38 and a second circulating memory 40. For purposes of illustration, the value of $k$ is chosen as three, so that, as shown, memories 38 and 40 each have a four-word storage capacity.

The input binary sample at time $m, X(m)$, produced at sampler and converter 10 is applied to one input of a multiplier 42, the other input to which is coupled to the input stage of memory 38. The output of multiplier 42 is applied to one input of a summer 44, and the other input to the summer is derived from the output stage of memory 40. The output of summer 40 is also coupled to an output line 46 at which the filter output value signal at time $m$, $Y(m)$, is derived. The output stage of memory 38 is coupled to one contact position A of a switch 48, and the input stage of that memory is also coupled to the movable contact 50 of switch 48. The other contact position B of switch 48 is coupled to the output of an input device 52 such as a tape reader or the like. Suitable control circuitry, similar to circuit control 36 in the FIG. 1 embodiment, are also included in the embodiment of FIG. 3 but are omitted from that figure in order to avoid unnecessary complexity.

To better understand the operation of the digital filter of FIG. 3, it will be helpful to expand equation (2) for $k=3$ as follows for the samples at times, $m$, $m+1$, $m+2$, and $m+3$, follows:

$$Y(m+3)=c(0)X(m+3)+C(1)X(m+2)+C(2)+X(m+X(m-3)$$

$$Y(m+1)=C(0)X(m+1)+C(1)X(m)+C(2)X(m-1)+C(3)X(m-2)$$

$$Y(m)=C(0)X(m)+C(1)X(m-1)+C(2C(2)X(m)+C(3)X(m-1)$$

$$Y(m+3)=c(0)X(m+3)+C(1)X(m+2)+C(2)+X(m+1)+C(AB3)X(m)$$

In the operation of the digital filter of FIG. 3, contact 50 of switch 48 is initially placed in the A position to thereby respectively transfer the four filter coefficients $C(0)-C(3)$ from input device 52 to the four locations or stages of memory 38.

Contact 50 is thereafter returned to the B position at which it remains for the remainder of the filtering operation on the input signal. The mth sample of an input signal, $X(m)$, is applied to one input of multiplier 42 and is maintained thereat while the filter coefficients in memory 38 are sequentially circulated in response to control pulses obtained from the control circuit (not shown) to the other input of the multiplier.

Multiplier 42 thus sequentially forms the products $C(0)X(m)$, $C(1)X(m)$, $C(2)X(m)$ and $C(3)X(m)$. These products are in turn sequentially added in summer 44 to the partial sums $\hat{Y}(m)$, $\hat{Y}(m+1)$, $\hat{Y}(m+2)$ and $\hat{Y}(m+3)$ previously stored in memory 40 to form the complete summation of the $Y(m)$ output value, and to update the still partial sums of $\hat{Y}(m+1)$, $\hat{Y}(m+2)$ and $\hat{Y}(m+3)$. The final value of output $Y(m$ is thus at this time available on line 46.

That is, for example, prior to the operation on the $X(m)$ input by the stored filter coefficients, the output stage of memory 40 contains the partial sum $\hat{Y}(m)$, that is, the sums of the products $C(1)X(m-1)$, $C(2)X(m-2)$ and $C(3)X(m-3)$, and the partial sum $\hat{Y}(m+1)$ stored in the preceding stage in memory 40 contains the sum of only the products $C(2)X(m-1)$ and $C(3)X(m-2)$ that were derived during previous input samples.

Following the above described operation on the $X(m)$ input, the previously computed $\hat{Y}(m)$ partial sum is completed by the addition thereto of the product $C(0)X(m)$ derived during the operation on the $X(m)$ input sample. Similarly, the $\hat{Y}(m+1)$, $\hat{Y}(m+2)$ and $\hat{Y}(m+3)$ partial sums previously stored in memory 40 are updated by the respective addition thereto of the products $C(1)X(m)$, $C(2)X(m)$, and $C(3)X(m)$ during the operation on the $X(m)$ sample.

Upon the completion of the cycling of the filter coefficients and their multiplication with sample $X(m)$, a new sample $X(m+1)$ is supplied to the input of multiplier 42, the storage locations in the memory 40 are shifted by one, and the input stage or location in memory 40 is reset by suitable means (not shown) to zero to permit its use for storing the partial sum $\hat{Y}(m+4)$ in subsequent operations on the succeeding input samples. The filter coefficients in memory 38 are once again recycled and the operation described above is repeated to complete the output value $Y(m+1)$ which at that time is presented on line 46.

To revise the nature of the filtering operation on the input signal all that need be done is to vary the filter coefficients stored in memory 38. This in turn may be readily achieved by changing the input coefficients contained in input device 52, clearing the stored coefficient words in memory 38, and placing switch 48 in its position A to insert the new coefficients from input device 52 into memory 38. Once memory 38 contains the new coefficients, switch 48 is returned to its B position to perform a filtering operation.

While the invention has been herein disclosed with respect to the embodiment of FIG. 1 for computing the autocorrelation function of a single analog signal, it could also be employed to equal advantage for computing cross correlation coefficients of a pair of input signals by replacing the multiplexer switch 20 by a second sampling unit to provide samples of a second analog signal which may be processed along the lines described with the first input signal to compute the cross correlation function between these signals.

Thus, while the present invention has been herein specifically described with respect to two embodiments thereof, it will be apparent that modifications may be made therein without departing from the spirit and scope of the invention.

I claim:

1. A system for deriving the correlation function of an input analog signal comprising means for sampling said input signal at a predetermined rate and for sequentially producing a binary sample representative of the analog value of said input signal at the time of sampling, first $k$-stage circulating memory means respectively storing in its stages the $k$ previously obtained binary samples, second $k$-stage circulating memory means respectively storing in its stages a set of previously computed $k$ correlation coefficients, product forming means coupled to the output of said sampling means and the input stage of said first memory means for initially forming the product of the most recent sampled binary signal with itself, and thereafter with each of said binary samples stored in said first memory means, and means coupled to t2 output of said product forming means having first and second inputs coupled respectively to the output stage of said second memory means and to the output of said product forming means, and an output coupled to the input stage of said second memory means, for respectively summing said products with corresponding ones of said stored correlation coefficients, to thereby update said correlation coefficients, and respectively restore the thus updated correlation coefficients into the stages of said second memory means.

2. The system of claim 1, in which said product forming means includes first and second inputs, switching means alternately operable in first and second positions coupled to said product forming means for applying when in said first position said recently produced binary sample to said first and second inputs of said product forming means, and when in said second position for sequentially applying the contents of said first memory means to one of said inputs of said product forming means.

3. The system of claim 2, further comprising means for selectively operating said switching means in its said first and second positions, and for sequentially transferring the contents of said first and second memory means to said product forming means and said summing means respectively when said switching means is in its said second position.

4. The system of claim 3, in which said first and second memory means comprises a $K$-word MOS circulating memory, wherein $K$ is an integer equal to the number of correlation coefficients stored in said second memory means and is independent of the number of samples taken of said input signal.

5. A digital filter system for deriving a predetermined function of an input signal comprising means for sampling said input signal and for producing a plurality of binary samples representative of said input signal, $m$-stage first circulating memory means respectively storing a plurality of filter coefficient reference signals in its stages, $m$-stage second circulating memory means respectively storing previously computed partial sums in its stages, means having first and second inputs respectively coupled to said sampling means and to the input stage of said first circulating means for selectively and sequentially forming the products of each of said sampled binary signals with predetermined ones of said coefficient signals stored in said first memory means, and means having first and second inputs coupled to the output of said product forming means and the output stage of said second memory means, and an output coupled to the input stage of said second memory means for respectively summing the thus-formed products with the partial sum signals stored in said second memory means, to thereby form the desired correlation function of the input signal of the output of said summing means.

6. The system of claim 5, further comprising a source of said reference signals, and switch means coupled to said source and said first memory means, and effective when in one position to transfer said reference signals into said first memory means.

7. The system of claim 6, in which said switch means when in a second position is effective to couple said first memory means to said product forming means.

* * * * *